3,471,490
GUANAMINES
Robert R. Rafos, Lyndhurst, and Diane G. Farrington, Euclid, Ohio, assignors to The Standard Oil Company, Cleveland, Ohio, a corporation of Ohio
No Drawing. Filed Apr. 21, 1967, Ser. No. 632,539
Int. Cl. C07d 55/20; C08g 9/30
U.S. Cl. 260—249.9          1 Claim

ABSTRACT OF THE DISCLOSURE

Guanamine compounds such as 3-nitro-3-methyl butyroguanamine, prepared by the reaction of dicyandiamide with 3-nitro-3-methyl-n-butylcyanide, when incorporated into melamine-formaldehyde formulations as a partial replacement for melamine, improves the stain resistance of the molding powder over commercial standard-grade molding powders.

This invention relates to new guanamine compounds having the following formula:

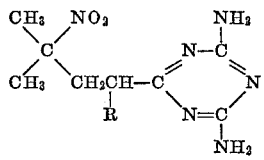

where R is H or CH$_3$. These compounds can be incorporated in molding powder formulations to improve stain resistance of articles molded therefrom.

Several of the better known guanamine compounds have been used in molding powder formulations to improve stain resistance of articles molded therefrom. These are benzoguanamine, methylacetylpimeloguanamine, and 1,2-cyclobutane dicarboguanamine. Not all guanamines, however, are suitable for providing stain-resistant quality. Of the latter group, triguanamine of nitrilotriacetonitrile and β-aminopropioguanamine are examples.

The following references disclose pertinent prior art: U.S. Patents Nos. 2,510,761; 2,579,985; 2,665,260; 2,684,366; Swiss Patent No. 308,280 (1955); Canadian Patent No. 455,200 (1949); and French Patent No. 1,416,760 (1965). U.S. Patent No. 3,408,254 discloses 1,2-cyclobutane dicarboguanamine.

The novel compounds are prepared by adding, to an autoclave, a diluent, a basic catalyst, dicyandiamide and a compound of the formula:

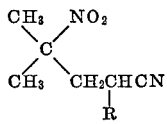

where R is H or CH$_3$. The latter two compounds are added in about 1:1 molar ratio.

Lower alcohols such as methanol, ethanol, and propanol can be used as diluents. Acetone is also a suitable diluent. Enough diluent should be added to prevent caking of the reactants. Basic catalysts such as Na(OH), K(OH), and (CH$_3$)$_4$N(OH) are preferred. About 1–5 weight percent of a basic catalyst is added, based on the weight of the reactants. Caution must be exercised not to add too much of the basic catalyst, since this will degrade dicyandiamide.

The autoclave is sealed and flushed with an inert gas, such as nitrogen, and then heated and maintained at a temperature in the range of 75–200° C. for a duration in the range of about ¼ to 3 hours. To promote the reaction, it is preferable to constantly agitate the contents of the autoclave. Anhydrous ammonia is added before the heating step, for the purpose of preventing decomposition of dicyandiamide.

Pressure increases with the progress of the reaction. Upon completion of the reaction, the pressure levels off, and this point can be used as an indication of the completed reaction.

The autoclave is cooled and the reaction product is purified by filtration and washing with cold water followed by recrystallization from hot water.

The fact that guanamines are insoluble in cold water but are soluble in hot water can be used as a criterion to determine what is meant by "cold water" and "hot water." Therefore, water maintained at a temperature at which the particular guanamine compound is insoluble is "cold water," while water, at a temperature at which the guanamine dissolves, is termed "hot water." In general, water at room temperature will not dissolve the guanamines, while water at about 90° C. will.

The novel guanamine compound can be incorporated into melamine-formaldehyde formulations as a partial replacement for the melamine to provide improvement in the stain-resistant quality over commercial standard-grade molding powders.

PREPARATION

The 3-nitro-3-methyl butyroguanamine was prepared from dicyandiamide and 3-nitro-3-methyl-n-butylcyanide according to the following reaction:

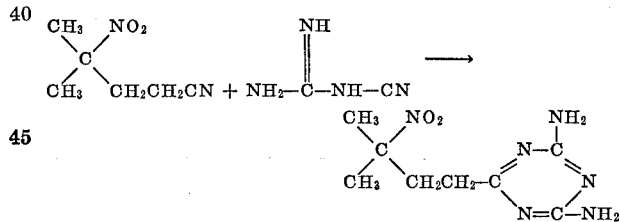

To a 250-ml. Magne-dash autoclave was charged 0.2 mole (28.3 grams) of 3-nitro-3-methyl-n-butylcyanide, 0.2 mole (16.8 grams) of dicyandiamide, 45 mls. of absolute methanol and 2.0 grams of sodium hydroxide pellets. The autoclave was closed, flushed with nitrogen, and was then charged with 32 grams of anhydrous ammonia. The autoclave was resealed and was heated to 88° C. with constant agitation. Rection temperatures of 88–108° C. were maintained for 1 hour, 10 minutes. During this time, pressures of 200–320 p.s.i.g. were reached. The autoclave was then cooled to room temperature, vented, and opened to give a yellow-tan slurry. Filtration, followed by cold-water washing gave crude yield of 19.2 grams, equivalent to 42.6 percent, of a tan solid which melted at 203.5–204.5° C. with decomposition. Recrystallization from hot water gave 11.0 grams (equivalent to 24.4 percent yield) of pale blue-green crystals which melted at 205–206° C. with decomposition. The structure of the compound was confirmed by infrared analysis.

FORMULATION AND PROCESSING OF THE MOLDING POWDERS 84.5 grams (2.82 moles) of formaldehyde in the form of 37 percent aqueous solution were placed in a round-bottom flask equipped with a stirrer, condenser, and thermometer. The solution was heated to 50° C. and the pH thereof adjusted to approximately 8.2 with 0.5 N sodium hydroxide solution. 150 grams (1.19 moles) of melamine and 50 grams (0.221 mole) of 3-nitro-3-methyl butyroguanamine were added to the solution and the temperature thereof raised to 85° C. in 5 minutes. The resin was prepared by raising the temperature to reflux (101° C.) in 10 minutes and continuing the reaction until a medium degree of polymerization was achieved.

426 grams of the mixture were added hot to 121 grams of α-cellulose paper and 2.85 grams of zinc stearate mold release agent. Mixing was accomplished in a Hobart dough mixer at a temperature of 45–60° C. for a period of 25 minutes. The duration of mixing depends on tackiness of material. Dry "popcorn" was produced by drying the resulting mixture in a tower dryer at 95° C. (inlet temperature) for a period of 1¼ hours. The dry "popcorn" was ground in a Bantam Mikropulversizer with a 0.03" herringbone screen. The ground powder was ball-milled for 5 hours with 0.5 percent by weight of titanium dioxide pigment and 0.8 percent by weight of phthalic anhydride as a catalyst. Materials were ball-milled for 5 hours and then removed and separated from the grinding balls by screening.

Molding was done on a 50-ton air-operated hydraulic press (Dake Corporation). A small dish mold 3¼" in diameter was used. A preform was made with a small hand press and the preform was put directly into the heated press. The form was then hot compression molded at 330° F. and 2,550 p.s.i. on the molding area of the article. The time of molding cycle was 1¼ minutes. The finished article had a faultless appearance, high gloss, and was free of surface imperfections and foreign matter.

Other test dishes were prepared in accordance with the above-described procedure incorporating different guanamines. The overall formulation in all examples was as follows:

3:1 weight ratio of melamine to guanamine
2:1 mole ratio of HCHO to guanamine
2:1 mole ratio of HCHO to melamine
1 wt. percent of zinc stearate on the basis of resin solids
30 wt. percent of α-cellulose paper on the basis of total solids
0.5 wt. percent of titanium dioxide on the basis of total solids
0.8 wt. percent of phthalic anhydride on the basis of total solids

PHYSICAL TESTING (A) Coffee stains.—The molded dish was divided into two halves and the stain test was performed on one-half of the dish. Test pieces were placed in a boiling coffee solution of 170 grams of instant coffee per 5,000 mls. of water for 8 hours. Care was taken to keep a constant level by adding water periodically. Following the boiling period, the test pieces were allowed to steep in the coffee solution during a cooling period for a total of 16 hours. The total staining cycle consumed 24 hours. The test pieces were then washed in detergent and dried.

Stained test pieces were evaluated for yellowness index using the ASTM D1925–62–T test method. This test procedure determined the degree of yellowness which would be observed under daylight illumination. The yellowness index of zero indicated the test dish was white. The instrument used for this test was a Hunter Lab Model D–25, Hunter Associates Laboratory, McLean, Va.

In this test, Δ stain was equivalent to the yellowness index after staining minus the yellowness index before staining.

(B) Impact strength.—Impact strength was measured by the height in inches that a 66-gram ball must be dropped in order to crack the surface of the dish. The dish was centered under the ball which was then dropped onto the flat surface of the dish. The ball was raised ¼" for each test until a crack was formed. The dish was inspected for hairline cracks on the reverse side by rubbing with pencil lead over the surface.

(C) Scratch resistance.—Scratch resistance was measured on a Taber Shear/Scratch Tester. The dish was placed on a platform and a diamond tip at the end of a cantilever beam placed on the dish. The dish was rotated and weights on a calibrated cantilever beam were increased until a scratch appeared on the dish. Measurements were recorded as the weight in grams required to produce a scratch on the surface. The instrument was manufactured by Taber Instrument Corporation, North Tonawanda, N.Y.

(D) Hardness.—Hardness was determined under the specifications of ASTM D785–62 on an Ames Portable Hardness Tester. The dish was placed between the ball and flat surface and then major and minor loads applied. Readings were made directly from a scale on the instrument. The manufacturer of the instrument was Ames Precision Machine Works, Waltham, Mass.

A comparison of the physical properties of the 3-nitro-3-methyl butyroguanamine-containing melamine-formaldehyde test dish with test dishes molded from commercially available melamine-formaldehyde molding resins, Plaskon® and Cymel® (Plaskon® and Cymel® are marketed by Allied Chemical Corporation and American Cyanamid Company, respectively, and are composed primarily of melamine, formaldehyde and α-cellulose (Zimmerman and Lavine, *Handbook of Material Trade Names*, 1953 edition, supplement I, p. 186 and supplement II, pp. 65–66, respectively)) is given in the table below.

| Molding powder | Rockwell M | Taber scratch (g.) | Falling ball (in.) | Unstained yellow index | Stained yellow index | Δ stain |
|---|---|---|---|---|---|---|
| Plaskon (Allied Chemical) | 122 | 260 | 7 | −0.1 | 61.5 | 61.6 |
| Cymel (American Cyanamid) | 122 | 300 | 6 | +1.5 | 64.3 | 62.8 |
| Containing 3-nitro-3-methyl butyroguanamine | 124 | 225 | 9 | 8.3 | 30.3 | 22.0 |
| Containing triguanamine of nitrilotriacetonitrile | 124 | 275 | 13 | Too high for measurement | | |
| Containing β-aminopropioguanamine | Could not formulate due to decomposition of the guanamine | | | | | |

The data in the above table demonstrate that the guanamine-containing resins have better stain resistance in the coffee-stain test than the standard commercial powders. Results of various physical property tests indicate that properties such as hardness, scratch resistance and impact strength are not altered by incorporating guanamine into the formulation. The data also show that not all of the guanamines are suitable for this purpose.

For example, the triguanamine of nitrolotriacetonitrile imparted too much color to the resin initially, even before staining, and the β-aminopropioguanamine decomposed on formulation and was therefore unsuitable.

We claim:
1. A compound having the following formula:

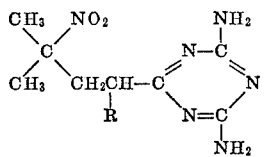

where R is H or CH₃.

References Cited

UNITED STATES PATENTS 2,735,850  2/1956  Jones _____ 260—249.9
2,792,395  5/1957  Thrower et al. _____ 260—249.9
2,832,779  4/1958  Ebel et al. _____ 260—249.9 XR HENRY R. JILES, Primary Examiner
JOHN M. FORD, Assistant Examiner U.S. Cl. X.R.
260—67.7